(12) United States Patent
Yakushev et al.

(10) Patent No.: US 7,954,112 B2
(45) Date of Patent: May 31, 2011

(54) AUTOMATIC RECOVERY FROM FAILURES OF MESSAGES WITHIN A DATA INTERCHANGE

(75) Inventors: Ruslan A. Yakushev, Sammamish, WA (US); Kartik Paramasivam, Redmond, WA (US); David Kent Downing, Bellevue, WA (US); Jean-Emile Elien, Bellevue, WA (US); Wei-Lun Lo, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1368 days.

(21) Appl. No.: 11/133,548

(22) Filed: May 20, 2005

(65) Prior Publication Data

US 2006/0265455 A1  Nov. 23, 2006

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/320; 719/313; 719/314

(58) Field of Classification Search .............. 709/206; 719/313–320; 717/114
See application file for complete search history.

(56) References Cited

U.S. PATENT DOCUMENTS

| | | | | |
|---|---|---|---|---|
| 6,643,712 | B1 * | 11/2003 | Shaw et al. | 719/321 |
| 7,028,289 | B2 * | 4/2006 | Allison | 717/114 |
| 7,480,918 | B2 * | 1/2009 | Astl et al. | 719/314 |
| 2003/0041178 | A1 * | 2/2003 | Brouk et al. | 709/313 |
| 2003/0093592 | A1 * | 5/2003 | Allison | 710/36 |
| 2004/0205136 | A1 * | 10/2004 | Whittenberger et al. | 709/206 |
| 2005/0021836 | A1 * | 1/2005 | Reed et al. | 709/238 |

OTHER PUBLICATIONS

Harold, Processing XML with Java: Reading XML, InformIT, Jan. 17, 2003, pp. 1-33.*

* cited by examiner

*Primary Examiner* — Diem K Cao
(74) *Attorney, Agent, or Firm* — Woodcock Washburn LLP

(57) ABSTRACT

Data interchanges are processed so that problematic individual elements within the data interchanges do not cause the processing of the data interchanges to be suspended unless there is a catastrophic error. The data interchanges are split up by flat file and/or XML disassemblers of a message engine into independent messages even if some elements are incorrect or cause processing failures. Those messages in the interchange that may be processed are processed, while those that would cause processing errors are suspended in a suspend queue for recovery processing. Even when a message is placed in the suspend queue, processing continues with the next independent message in the data interchange. Messages that are placed in the suspend queue for lack of routing information may be resumed by providing the routing information and again attempting to route the previously suspended message. The method of the invention is scalable since it works regardless of the size of the interchange or its individual message elements.

20 Claims, 10 Drawing Sheets

AUTOMATIC RECOVERY FROM FAILURES OF MESSAGES WITHIN A DATA INTERCHANGE

COPYRIGHT NOTICE AND PERMISSION

The invention allows graceful handling of the errors encountered during processing of interchanges with problematic individual elements and then recovering the processing from the next good element. In particular, the error handling method of the invention splits up the received data interchanges using flat file and/or XML disassemblers into independent messages even if some elements are incorrect or cause processing failures. Those messages in the data interchange that may be processed are processed and routed, if possible, while those that would cause processing errors or that do not have routing information are suspended for recovery processing. The method of the invention is scalable since it will work regardless of the size of the interchange or its individual message elements.

FIELD OF THE INVENTION

The present invention relates to interchange processing in a computer system, and more particularly, to systems and methods for handling errors encountered during interchange processing by breaking up the interchange into separate independent messages and processing all messages that may be processed while taking steps to recover those messages that cause processing problems.

BACKGROUND OF THE INVENTION

Enterprise Application Integration (EAI) solutions typically facilitate efficient processing solutions by aggregating a plurality of messages into a message bundle referred to herein as an interchange. For example, the EAI system may include business software that collects data over the course of a day and sends the collected messages to a business partner in an serial data interchange of individual messages once per day. The interchange may be represented, for example, by a flat file or XML, and the interchange passes through a receive pipeline at a receive location where the interchange is processed by an endpoint manager to determine whether each message in the flat file or XML interchange is to be routed to any particular recipients. If a routing is requested, the message(s) are routed to the recipient(s) for further processing.

Exchanging of such data interchanges containing multiple elements is a very common practice in EAI solutions. A simple example of such an interchange is an order placed by a customer on a retailer web site. A typical order consists of more than just a single line item. Also, each line item may represent a document that needs to be handled by a different inventory system. The recipient of the interchange that represents the order may need to split up the interchange into smaller independent messages that correspond to each line item. Those messages or documents then will be sent to corresponding inventory systems.

Very often the interchanges contain errors that cause the process of splitting the interchange into individual messages to fail. The range of errors may be very wide: from format mistakes or inconsistencies to business logic problems. The recipient of the interchange needs to be able to determine the erroneous elements and to filter them out from the interchange so that the rest of the elements are still processed successfully. Unfortunately, given the format of the interchanges (typically XML or flat file) and potentially their large sizes, it becomes very difficult and in some cases not possible to recover from a failure in the middle of the processing and to continue processing from the next good element.

Conventional EAI products, such as Microsoft's BizTalk Server family, IBM WebSphere, BEA WebLogic, Tibco, and the like typically handle such errors in one of two ways:
1. When the first error is encountered during interchange processing, the processing is stopped, all the messages that were already produced are rolled back, the original interchange is suspended, and the operator is informed of the failure, and/or
2. When the first error is encountered during interchange processing, the processing is stopped, the messages that were already produced are allowed to continue processing, the remainder of the original interchange is suspended, and the operator is informed of the failure.

For example, FIG. 1 is a simplified illustration of an EAI solution where a flat file or XML interchange 10 containing a plurality of serialized messages or documents DOC1, DOC 2, DOC 3, and DOC4 is to be processed by an endpoint manager 20 including a receive pipeline 30 at a receive location 40. In the example of FIG. 1, it is assumed that the message DOC3 contains a format or some other error that will prevent its successful processing by the endpoint manager 20. In the conventional EAI systems, the first two messages, DOC1 and DOC2, are processed successfully. However, when the processing of DOC3 fails, the processing of the entire flat file or XML interchange 10 is stopped, and either DOC1 and DOC2 are rolled back or DOC1 and DOC2 are allowed to continue processing. In either case, the remainder of the processing of the flat file or XML interchange 10 is suspended and the operator informed of the failure. In the first prior art embodiment, shown in FIG. 2A, nothing is stored in the message queue 50 while the entire flat file or XML file interchange 10 is stored in the suspend queue 60 for recovery processing. On the other hand, in the second prior art embodiment, shown in FIG. 2B, DOC1 and DOC2 are stored successfully in the message queue 50, while processing of DOC3 and DOC4 is not completed. As a result, DOC3 and DOC4 are stored in the suspend queue 60.

Such processing is relatively inefficient because there may be relatively few problematic entries that hold up the processing of a potentially very large data interchange. For example, if DOC3 is followed by hundreds of additional messages in the interchange, little or no processing would be permitted to proceed until the recovery processing were completed. Applicant is not aware of an EAI product that instead enables the interchange processing to proceed, despite problematic messages in the interchange, by suspending only the problematic element in its original form when an error is encountered during interchange processing, searching for the next valid element in the interchange, and resuming processing with the next valid element while, at the same time, the operator is informed of any failures. As illustrated in FIG. 2C, if such a methodology were available and applied to the above example, DOC1, DOC2, and DOC4 would be successfully stored in the message queue 50, while only the message with the error (DOC3) would be sent to the suspend queue 60 for recovery processing.

The processing approach illustrated in FIG. 2C would provide significant processing efficiency, particularly in the case of large interchanges; however, to date, the processing characteristics of typical EAI solutions do not incorporate such an error handling method for processing interchanges. It is desired to provide a technique for graceful handling of the errors encountered during processing of data interchanges with problematic individual elements and for recovering the processing from next good element in the input data stream. The present invention addresses this need in the art.

SUMMARY OF THE INVENTION

The invention allows graceful handling of the errors encountered during processing of interchanges with problematic individual elements and then recovering the processing from next good element. In particular, the error handling method of the invention splits up the received data interchanges using flat file and/or XML disassemblers into independent messages even if some elements are incorrect or cause processing failures. Those messages in the data interchange that may be processed are processed and routed, if possible, while those that would cause processing errors or that do not have routing information are suspended for recovery processing. The method of the invention is scalable since it will work regardless of the size of the interchange or its individual message elements.

In accordance with an exemplary embodiment of the method of the invention, a method is provided for processing multiple independent messages in a recoverable data interchange, comprising the steps of:
 (a) for each message in the data interchange, checking if the message may be validly processed;
 (b) if a message in the data interchange may not be validly processed, placing the message in a suspend queue;
 (c) if the message in the data interchange may be validly processed, determining if a routing is available for the message;
 (d) if routing is available for the message, placing the message in a message queue, otherwise placing the message in the suspend queue;
 (e) getting a next message in the data interchange; and
 (f) repeating steps (a)-(e) for at least the next message.

The method of the invention also permits a resume process of a suspended message upon receipt of routing information for the suspended message, provided that the message was suspended for lack of routing information and not for a processing (format) error. Messages that remain in the suspend queue further may be subjected to recovery processing.

In an exemplary embodiment, the method of the invention may be used to process messages in a flat file format and/or an XML format in an input interchange data stream. In the case of a flat file format disassembler, a starting position of the current message in the input interchange data stream is maintained, the current message is processed, and the processed current message is written to a virtual input stream that has data buffering capability with a buffer stored on the file system. During processing, if the current message is processed with an error, the virtual stream is discarded, the start position of the next message is determined, and the original stream contents starting at the beginning of the current message up to but not including the starting position of the next message is set as the received messages for subsequent processing. An indication is also generated so that the current message will be placed in the suspend queue. On the other hand, if the current message is processed without an error, the disassembler replaces the input interchange data stream with the virtual stream and indicates that the current message should be placed in the suspend queue in the event of a routing error. Similarly, when the multiple independent messages are in an XML file format in the input interchange data stream, the disassembler processes the current message and writes the processed current message to a virtual input stream. Then, if the current message is processed with an error, the disassembler performs the steps of rewinding the virtual input stream, setting the virtual input stream as the received messages for subsequent processing, and indicating that the current message is to be placed in the suspend queue. On the other hand, if the current message is processed without an error, the disassembler performs the steps of rewinding the virtual input stream, setting the virtual input stream as the received messages for subsequent processing, and indicating that the current message should be placed in the suspend queue in the event of a routing failure.

The scope of the invention also includes a system and a computer readable media including software for implementing the methods of the invention. Other features and advantages of the invention may become apparent from the following detailed description of the invention and accompanying drawings.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary embodiments of various aspects of the invention; however, the invention is not limited to the specific methods and instrumentalities disclosed. In the drawings.

DETAILED DESCRIPTION OF ILLUSTRATIVE EMBODIMENTS

Figure 1:
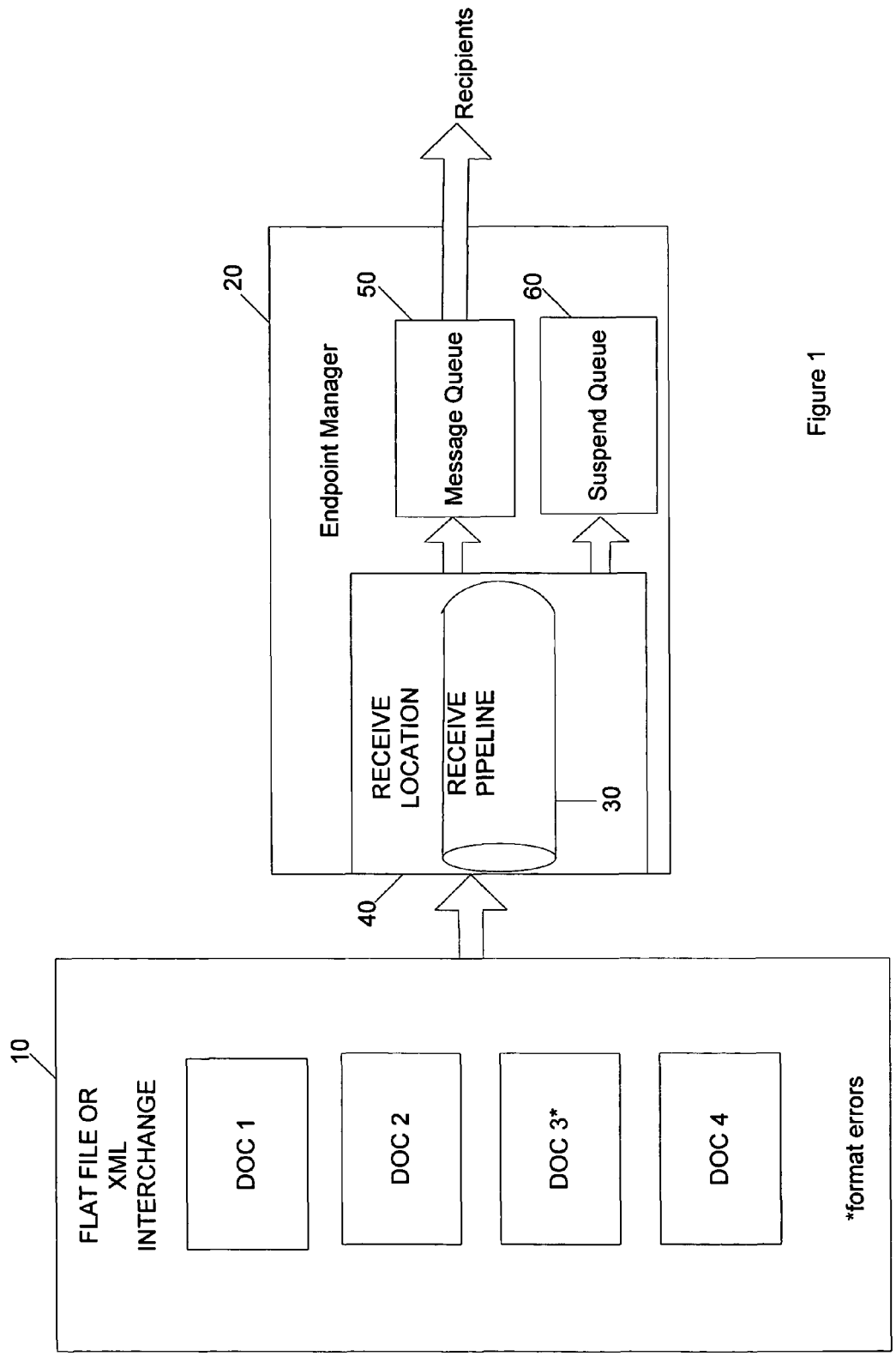
FIG. 1 illustrates an exemplary EA system in which a plurality of messages are aggregated into a flat file or XML interchange for processing by an endpoint manager to determine if the received messages need to be routed.
Figure 2A:
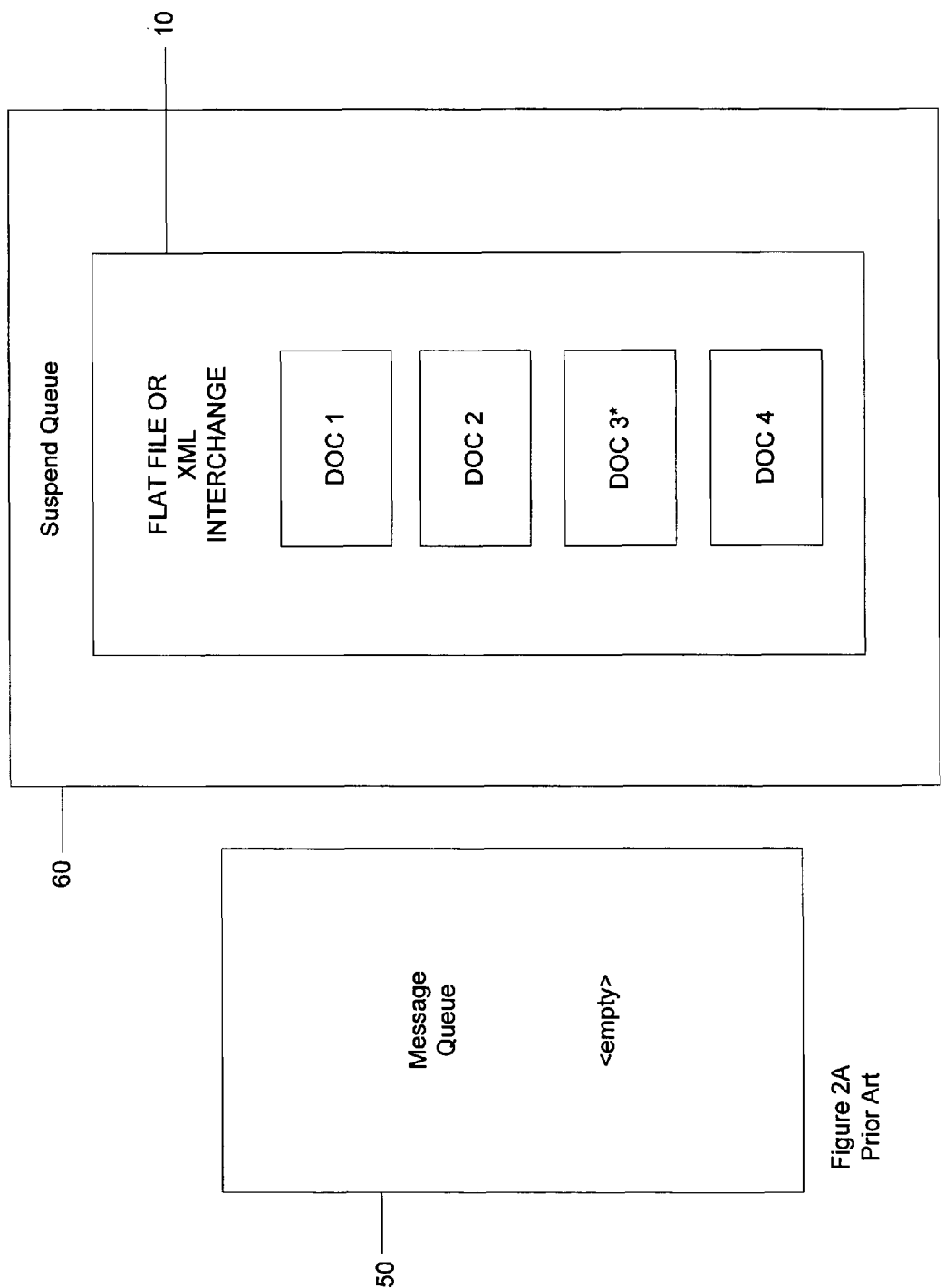
FIG. 2A illustrates the results of the processing of the flat file or XML interchange illustrated in FIG. 1 in a conventional EAI system in which any error in the interchange causes all processing of the interchange to be rolled back.
Figure 2B:
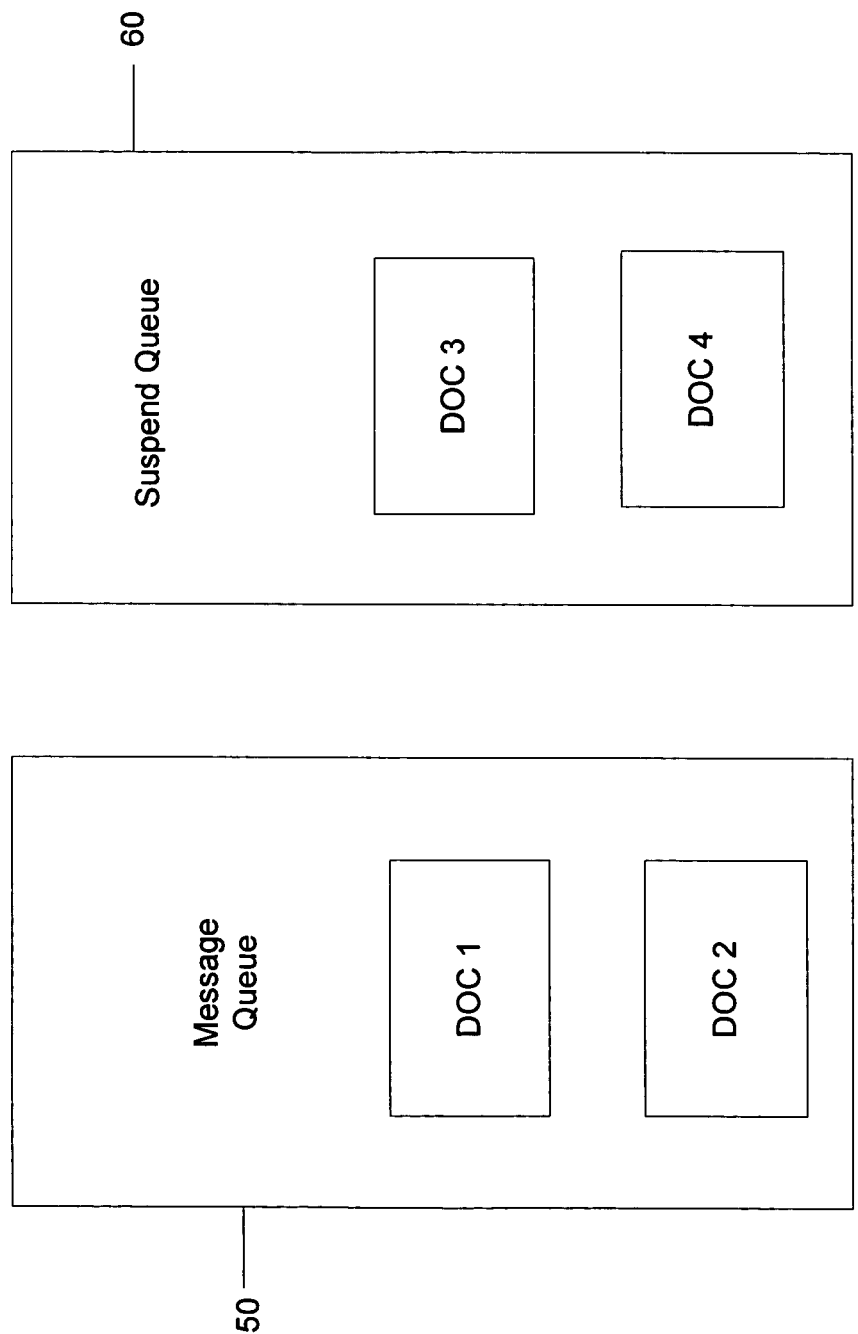
FIG. 2B illustrates the results of the processing of the flat file or XML interchange illustrated in FIG. 1 in a conventional EAI system in which any error in the interchange suspends all further processing of the interchange but does not roll back the processing of messages that have already been successfully completed.
Figure 2C:
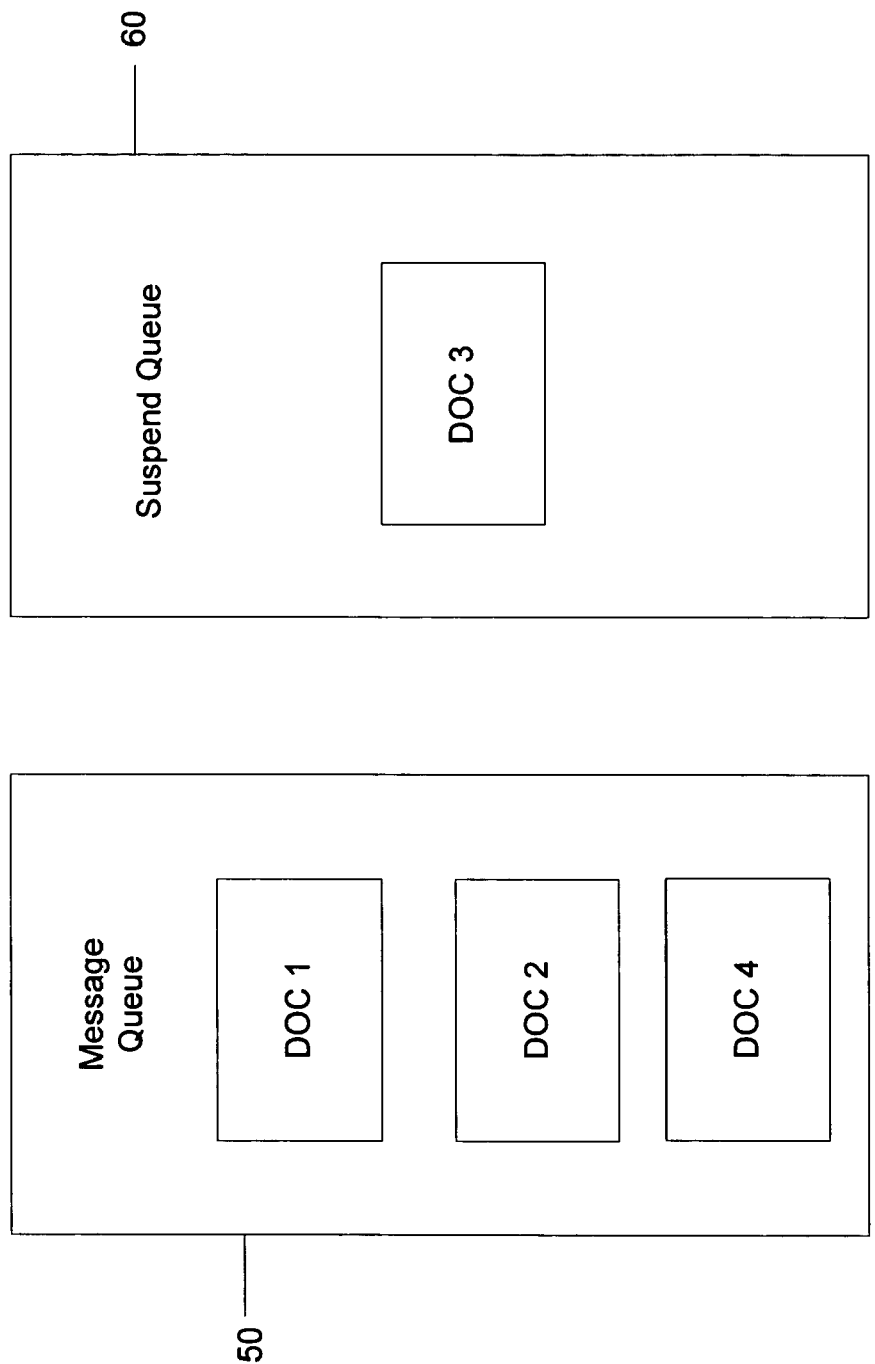
FIG. 2C illustrates the results of the processing of the flat file or XML interchange illustrated in FIG. 1 in an EAI system in accordance with the invention whereby only processing of the messages causing errors are suspended.

The subject matter of the present invention is described with specificity with respect to FIGS. 1-8 to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Preliminaries and Definitions

The following terms shall have the definitions set forth below to the extent such definitions are inconsistent with general usage of these terms by those skilled in the art:

Message—a discrete unit of data that is serialized into a format used for transmission from sender to receiver. Normally a transmission process consists of the data serialization of messages at the sender side and copying of the serialized messages to the receiver, who then de-serializes the messages into the original independent messages.

Interchange—a message that contains multiple messages that may be processed independently. An example of interchange is an XML envelope that contains many XML documents. Another example is a series of line items that may or may not be surrounded by a header and trailer within a flat file message.

Suspended message—a message that failed processing and may be placed into a dedicated storage for failed messages (e.g. dead letter queue, folder on a file system, or a table in a SQL database).

Catastrophic error—an error encountered during interchange processing that does not allow the processor to find the next good document in the interchange.

Recoverable error—an error encountered during interchange processing that allows the processor to find the next good document in the interchange and to continue processing from there.

Disassembler—a component that performs de-serialization and splitting up of interchanges.

Virtual Stream—stream that has data buffering capability with buffer stored on the file system. If the stream data size is within predefined threshold the data is stored in memory. But if the size threshold is exceeded then exceeding part of data is buffered to a file system.

Recoverable interchange processing—splitting of the interchange into individual messages while recovering from failures caused by invalid messages encountered during the processing.

SeekableReadOnlyStream—a data stream implementation that allows the consumer of the stream to seek backwards and forwards within the data but that prevents the consumer from modifying the data itself.

Routing Failure—if there are no configured subscribers (i.e. none of the running applications are interested in the message), then the message fails to route and is called a routing failure.

XML Disassembler—a pipeline component in an EAI system such as Microsoft's BizTalk system that is responsible for processing through the XML in the input interchange stream.

Endpoint Manager—a messaging engine that interacts with adapters (transports like HTTP, FILE, POP3, SQL) to get messages into an EAI system such as Microsoft's BizTalk system. The endpoint manager executes the configured pipeline components and publishes the output of the pipeline components to a database (message box) for routing to the proper message recipients.

Sample Embodiments

Figure 3:
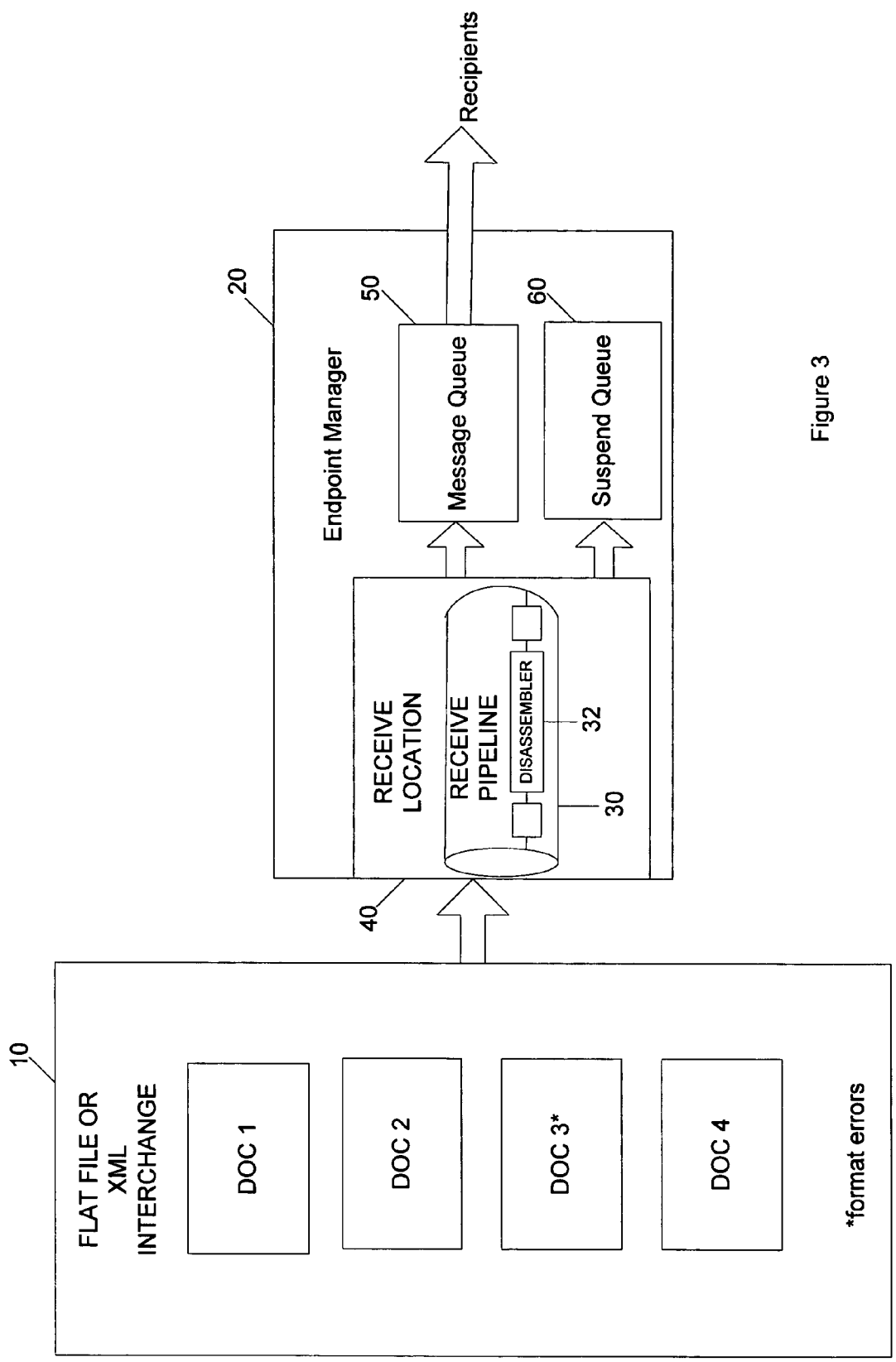
FIG. 3 illustrates an EAI system that has been modified to include a disassembler that will support recovery from processing errors in accordance with the invention.

In accordance with the invention, the receive pipeline 30 at the receive location 40 of the endpoint manager 20 of the EAI processing system of FIG. 1 is modified to include a disassembler that implements an algorithm that allows for the recovery from failures that occur during disassembling of flat file or XML interchanges 10. Such a disassembler 32 in accordance with the invention is illustrated in FIG. 3. As will be explained in more detail below with respect to FIGS. 4 and 5, the disassembler 32 may include an algorithm for disassembling flat file and/or XML interchanges.

Recovery from failures in Flat File Interchanges

Generally, upon receipt of a serialized flat file interchange 10 in the receive pipeline 30 of the endpoint manager 20, if the recoverable interchange processing feature of the invention is enabled, the flat file disassembler 32 initiates processing and wraps the received flat file interchange 10 into a virtual stream using the class ReadOnlySeekableStream to ensure that the interchange data stream can be sought back (rewound) to the beginning of the stream. Then, while processing each message within the flat file interchange 10, the input data stream is pre-processed (parsed) and written to a virtual stream. If any errors occur during processing, the input stream is scanned for the boundary of the next message in the flat file interchange 10. After obtaining the start and end position for the failed message, a new type of stream is created with access to the input stream and the start and end positions of the failed message. This new stream is set as the data stream of the output message and when read will provide the native data of the failed message as it is being read. When this stream reaches the end of the failed message, it returns 0 bytes read or −1 for the stream read methods. If the message is successfully processed into the virtual stream, on the other hand, the virtual stream is sought to the beginning and set as the data stream of the output message.

If the message is successfully processed by the flat file disassembler 32, the virtual stream will be set as the output message presented to downstream components and the system message context property SuspendMessageOnRoutingFailure will be set to true. However, if the message fails processing, the start position of the next message will be determined and the original input message will be rewound and presented as a native stream with the system message context property MessageDestination set to identify the suspend queue 60.

The receive location 40 that hosts and executes disassembler components within receive pipeline 30 needs to be aware if the flat file disassembler 32 is processing interchanges using an error recovery algorithm. The receive pipeline 30 is responsible for analyzing the output of the disassembler 32 and forwarding the disassembled messages in accordance to the result of processing. Normally the successfully processed messages are stored in message queue 50 to continue their way through the processing system, while failed messages are forwarded to a dedicated storage (e.g. dead letter queue or suspend queue 60).

A first embodiment of the disassembler of the present invention allows for processing of a flat file interchange without completely suspending processing when a problematic message is encountered. To explain the operation of the first embodiment of the invention, it will be assumed that the following flat file interchange needs to be processed:

```
1234567890123456789012345678901234567890123456789012345679801234657890123456 7
ADDRUS          Alice Smith         123 Maple Street    Mill Valley    CA  90952

ADDRUS          John Dow              8 Oak Avenue      Old Town       PA  95819

$$$$$$$$$$$$$$  Robert Smith         10 Elm Street      New Town       IL  78921

ADDRUS          Jane Smart          123 Main Street     Some Town      WA  95819
```

Each line in this flat file interchange represents a separate element (a person's address) that should be processed independently. As in the example shown in FIG. 3, it is also assumed that the third element in the interchange contains a format error (marked in bold). Out of this interchange, flat file disassembler 32 in the receive pipeline 30 produces the following:

Lines 1 and 2—XML documents ready for subsequent processing;
Line 3—document in a flat file format because it failed parsing; and
Line 4—XML document ready for subsequent processing.

Figure 4:
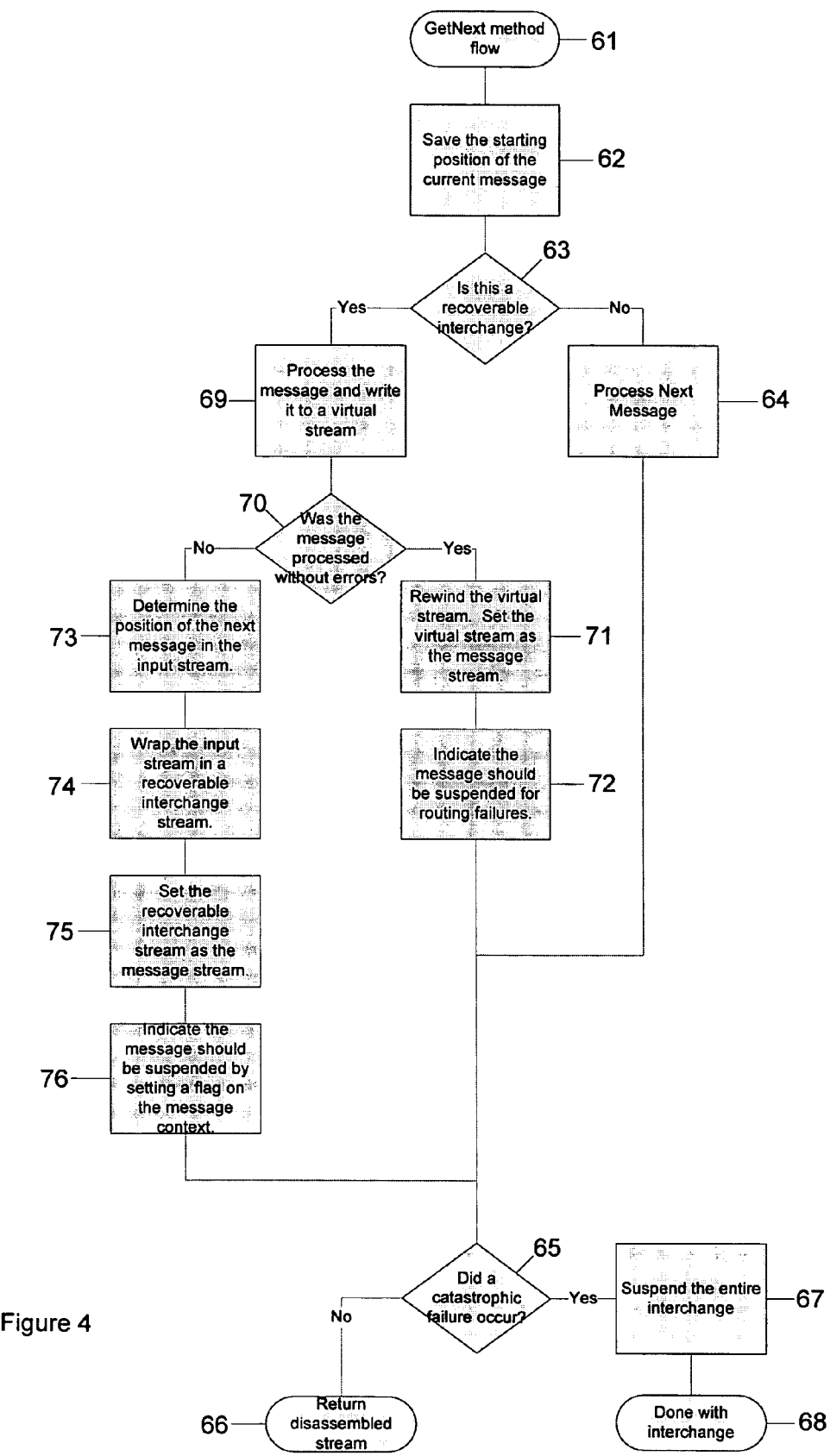
FIG. 4 illustrates flat file disassembler processing in accordance with the invention.

In accordance with the invention, the flat file disassembler 32 recovered from the parsing failure on line 3, found the next good element in the flat file interchange 10, and continued processing. Lines 1, 2 and 4 end up in the virtual stream that is sent to the message queue 50 for routing to recipients, while line 3 is sent to the suspend queue 60 for recovery processing. FIG. 4 illustrates a logical flow of the flat file disassembler 32 and the processing flow for getting the next message in the flat file interchange 10.

As illustrated in FIG. 4, processing of the received flat file interchange 10 starts at step 61 by grabbing the next message (document) from the flat file interchange 10. The starting position of the current message is then stored at step 62. It is determined at step 63 whether the received flat file interchange 10 is a recoverable interchange in accordance with the invention. This check is desired if the recoverable interchange feature is user-configurable but is not necessary if the feature is not user-configurable. If the recoverable interchange feature is not supported, the next message is processed in a conventional fashion at step 64. If a catastrophic error does not occur during the processing of the next message (step 65), then control returns to the disassembled stream at step 66 for further conventional processing. Otherwise (a catastrophic error did occur), the entire interchange is suspended at step 67 in the conventional fashion and processing concludes at step 68.

However, if it is determined at step 63 that the received flat file interchange 10 is a recoverable interchange in accordance with the invention, then the message is processed at step 69 and written to a virtual stream as described above. If it is determined at step 70 that the message is processed without errors (and is the type of data expected), then the virtual stream is rewound and the virtual stream is set as the message stream at step 71. At step 72, the context property SuspendMessageOnRoutingFailure of the message is set to true to indicate that the message is valid but should be suspended for routing failures. Since the message was processed without errors, at step 65 control is passed to the disassembled stream (step 66) for processing of the next message.

However, if it is determined at step 70 that the message was processed with errors (format errors and the like), then the position of the next message in the input stream is determined at step 73 and the input stream is wrapped in the recoverable interchange stream at step 74 and presented as the native stream at step 75. The system message context property MessageDestination is set at step 76 to indicate that the message is not representative of the schema expected by the receive pipeline 30 (i.e., not valid) and should be suspended and sent to the suspend queue 60. If the failure was catastrophic (step 65), processing is suspended at step 67 and processing of the interchange ends at step 68. Otherwise, processing continues by returning to step 61 to process the next message (step 66).

Upon completion of the processing by the flat file disassembler 32 (FIG. 4), the tagged messages pass through the receive pipeline 30 for further processing. For example, flat files may be converted to XML streams in addition to other internal buffering and processing techniques. As will be explained below with respect to FIG. 6, the endpoint manager 20 eventually receives the processed normalized messages output by the receive pipeline 30 and determines whether each respective message is to be sent to a message queue 50 for routing or to a suspend queue 60 for recovery processing.

Recovery from Failures in XML Interchanges

In accordance with a second embodiment of the invention, an XML interchange is processed without completely suspending processing when a problematic message is encountered. To explain the processing of an XML interchange in accordance with the invention, it will be assumed that the following XML interchange needs to be processed:

```
<addresses>
    <address>
        <Country>US</Country>
        <Name>Alice Smith</Name>
        <Street>123 Maple Street</Street>
        <City>Mill Valley</City>
        <State>CA</State>
        <Zip>90925</Zip>
    </address>
    <address>
        <Country>US</Country>
        <Name>John Dow</Name>
        <Street>8 Oak Avenue</Street>
        <City>Old Town</City>
        <State>PA</State>
        <Zip>ABCDE</Zip>
    </address>
    <address>
        <Country>US</Country>
        <Name>Jane Smart</Name>
        <Street>123 Main Street</Street>
        <City>Some Town</City>
        <State>WA</State>
        <Zip>98193</Zip>
    </address>
</addresses>
```

This interchange contains three elements <address> that each need to be processed independently. In this example, the second element has a validation error in it that is highlighted in bold. Out of this interchange, the XML disassembler 32' of the invention produces 3 documents:

Element 1—XML documents ready for subsequent processing;
Element 2—XML document to be suspended; and
Element 3—XML document ready for subsequent processing.

As in the flat file example, the XML disassembler 32' recovered from the validation failure with respect to element 2 and found the next good element in the XML interchange 10 for processing. As in the case of the flat file disassembler 32, each input message is completely processed and written to its own virtual stream. If the message succeeds in its processing, the system message context property SuspendMessageOnRoutingFailure will be set to true. However, if the message fails processing, the system message context property MessageDestination will be set to suspend queue 60. After a message has been completely processed into the virtual stream, the virtual stream will be rewound and presented to the downstream component using the return value from the GetNext( ) method call illustrated in FIG. 5, which illustrates a logical flow of the XML disassembler 32' and the processing flow for getting the next message in the interchange.

Figure 5:
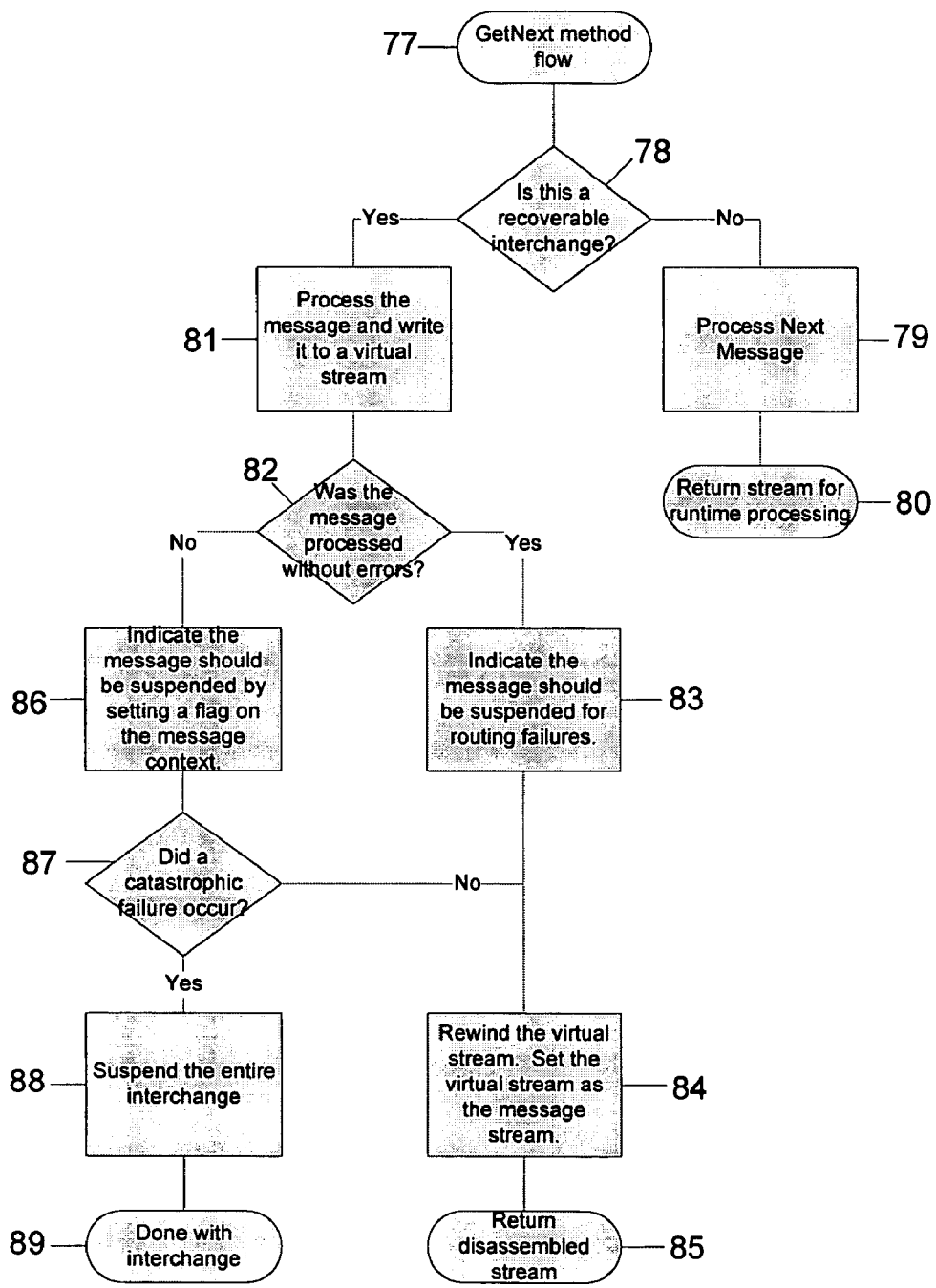
FIG. 5 illustrates XML file disassembler processing in accordance with the invention.

As illustrated in FIG. 5, processing of the received XML interchange 10 starts at step 77 by grabbing the next message (document) from the XML interchange 10. It is determined at step 78 whether the received XML interchange 10 is a recoverable interchange in accordance with the invention. If not, the next message is processed in a conventional fashion at step 79 and the stream of the XML interchange 10 is returned for runtime processing at step 80. However, if it is determined at step 78 that the received XML interchange 10 is a recoverable interchange in accordance with the invention, then the message is processed at step 81 and written to a virtual stream as described above. If it is determined at step 82 that the message is processed without errors, then at step 83, the context property SuspendMessageOnRoutingFailure of the message is set to true to indicate that the message is valid but should be suspended for routing failures. At step 84, the virtual stream is rewound and the virtual stream is set as the message stream. Since the message was processed without errors, at step 85 control is passed to the disassembled stream.

However, if it is determined at step 82 that the message was processed with errors (format errors and the like), then the system message context property MessageDestination is set at step 86 to indicate that the message should be suspended and sent to the suspend queue 60. If the failure was catastrophic (step 87), processing of the entire XML interchange 10 is suspended at step 88 and processing of the XML interchange 10 ends at step 89. Otherwise, the virtual stream is rewound and the virtual stream is set as the message stream at step 84 and control is passed back to the disassembled stream for further message processing.

Upon completion of the processing by the XML disassembler 32' (FIG. 5), the tagged messages pass through the receive pipeline 30 for further processing. As will be explained below with respect to FIG. 6, the endpoint manager 20 eventually determines whether each respective message is to be sent to a message queue 50 for routing or to a suspend queue 60 for recovery processing.

Handling Message Suspension and Routing Failure

As noted above with respect to FIG. 3, the endpoint manager 20 gives the input interchange 10 to the receive pipeline 30. The receive pipeline 30 can produce multiple messages in streaming fashion (i.e., the endpoint manager 20 pulls the stream of each message) and publish these messages to a database for processing by a routing algorithm. If there is any failure in the receive pipeline 30 (e.g., XML validation error), then the input message in the input interchange is suspended. On the other hand, in accordance with the recoverable interchange method of the invention, there are some failures that are recoverable. If the receive pipeline 30 hits a recoverable failure, then it marks that message for suspension and gives the message to the endpoint manager 20 using the techniques described above. Since there is no fatal error, the endpoint manager 20 continues the pipeline processing by again calling GetNext( ).

If the recoverable error is a "routing failure" that is detected by the endpoint manager 20 when a message is published to the database, then the endpoint manager 20 will suspend the message that was produced by the receive pipeline 30 (the message that was published) and then continue processing. The point to be noted is that all of this happens under the same transaction. Basically, the failure handling honors the rule of the transactional nature of the message processing.

In accordance with recoverable interchange processing in accordance with the invention, the message is suspended that comes out of the receive pipeline 30, as opposed to the input of the receive pipeline 30. To allow this to be implemented, other aspects of the EAI system also need to be adjusted to handle this anomaly. For example, the invention may allow an administrator to go in and "resume" a suspended message. When this happens, the endpoint manager 20 has to take care to skip the pipeline execution for the resumed message if it was a pipeline output message (because the receive pipeline 30 has already been executed). Also, since the invention tracks all the messages that come into receive pipeline 30 and all messages that exit out of the receive pipeline 30 and whether there are any failures, special handling needs to be performed to track these kinds of recoverable failures. The invention thus also has the ability to publish/route a message instead of suspending it. This also needs to be adjusted to handle suspension of the output messages of receive pipeline 30.

Figure 6:
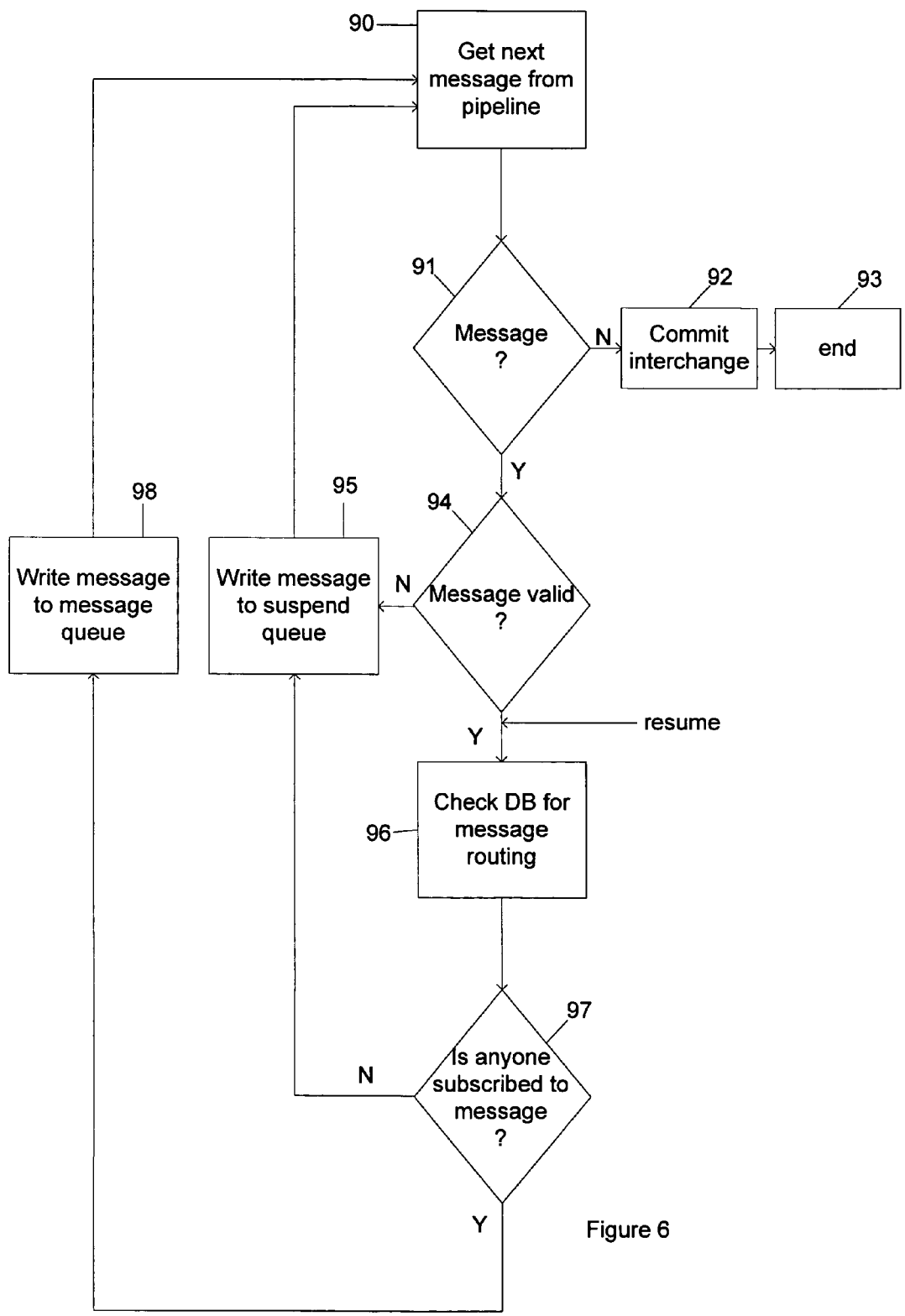
FIG. 6 illustrates the processing performed by the endpoint manager upon receipt of the processed disassembled messages.

FIG. 6 illustrates the processing performed by the endpoint manager 20 upon receipt of the processed (normalized) disassembled messages from the receive pipeline 30. As illustrated in FIG. 6, processing of the disassembled messages starts at step 90 by getting the next normalized message from the receive pipeline 30. If all messages have been processed, then at step 91 it is determined that the interchange 10 may be committed at step 92 and the process ends at step 93. However, if a message is received, the message is checked at step 94 to determine the results of the processing by the disassembler 32, namely, whether the message is valid or not. If not (e.g., the MessageDestination flag is set), the message is written to the suspend queue 60 at step 95 for recovery processing. The next message is then retrieved at step 90.

However, if the message is determined to be valid at step 94, then at step 96 the routing database is checked for message routing data for the received message. If the routing algorithm (database entries) indicate that no one is to receive the current message, then at step 97 the message is suspended and written to the suspend queue 60 at step 95 for a routing failure. On the other hand, if routing data is present in the routing database, then the message is written to the message queue 50 at step 98 for routing to the proper destination.

Those skilled in the art will appreciate that other modifications to conventional receive pipelines may be made to implement the features of the invention. For example, the receive pipeline 30 conventionally tracks messages into and out of the receive pipeline using a counter. In accordance with the invention, the counter would need to be adjusted for each disassembled message that is to be suspended. It may also be desirable to modify the receive pipeline 30 to check for a valid user before suspending a message. The invention may also support a resume feature whereby the suspended message in the suspend queue 60 may be pulled from the suspend queue 60 and reinserted into the processing at step 96 (FIG. 6) in the event that a recipient (and associated routing information) of the suspended message becomes available. The message would then pass back through the routing procedure indicated above.

Though the invention is described in the context of a BizTalk EAI system available from Microsoft Corporation, those skilled in the art will appreciate that many other EAI systems may be modified to implement the techniques of the invention. Also, those skilled in the art will appreciate that the disassembler 32 of the invention may be placed anywhere along the receive pipeline 30 in accordance with whether or not the messages are to be processed together or independently. Accordingly, the invention is not intended to be limited to the particular embodiments described herein.

Exemplary Computer Environment

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for persisting objects in a database store in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the object persistence methods of the present invention.

Figure 7:
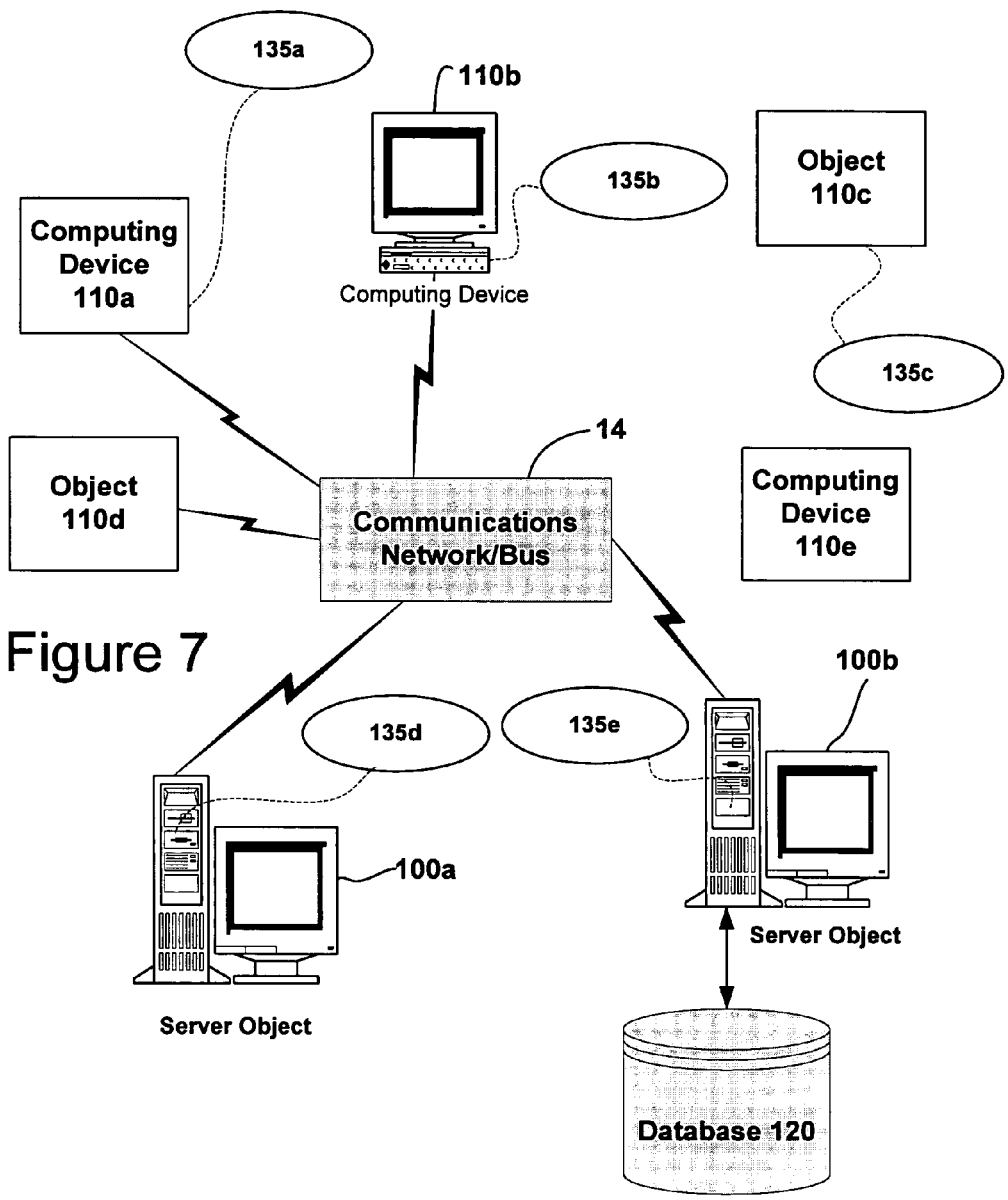
FIG. 7 is a block diagram representing an exemplary network environment having a variety of computing devices in which the present invention may be implemented.

FIG. 7 provides a schematic diagram of an exemplary networked or distributed computing environment. The distributed computing environment comprises computing objects 100a, 100b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices that provide services to the system of FIG. 7, and may itself represent multiple interconnected networks. In accordance with an aspect of the invention, each object 100a, 100b, etc. or 110a, 110b, 110c, etc. may contain an application that might make use of an API, or other object, software, firmware and/or hardware, to request use of the processes used to implement the object persistence methods of the present invention.

It can also be appreciated that an object, such as 110c, may be hosted on another computing device 100a, 100b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 7, computers 110a, 110b, etc. can be thought of as clients and computer 100a, 100b, etc. can be thought of as servers, although any computer could be considered a client, a server, or both, depending on the circumstances. Any of these computing devices may be processing data in a manner that implicates the object persistence techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the persistence mechanism of the invention may be distributed across multiple computing devices.

Client(s) and server(s) may communicate with one another utilizing the functionality provided by a protocol layer. For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 7 illustrates an exemplary networked or distributed environment, with a server in communication with client computers via a network/bus, in which the present invention may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to maintain a persisted object.

In a network environment in which the communications network/bus 14 is the Internet, for example, the servers 100a, 100b, etc. can be servers with which the clients 110a, 110b, 110c, 110d, 110e, etc. communicate via any of a number of known protocols such as HTTP. Servers 100a, 100b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 100a, 100b, etc. may be equipped with various application program modules or objects 135 and with connections or access to various types of storage elements or objects, across which files or data streams may be stored or to which portion(s) of files or data streams may be downloaded, transmitted or migrated. Any computer 100a, 100b, 110a, 110b, etc. may be responsible for the maintenance and updating of a database, memory, or other storage element 120 for storing data processed according to the invention. Thus, the present invention can be utilized in a computer network environment having client computers 110a, 110b, etc. that can access and interact with a computer network/bus 14 and server computers 100a, 100b, etc. that may interact with client computers 110a, 110b, etc. and other like devices, and databases 120.

Figure 8:
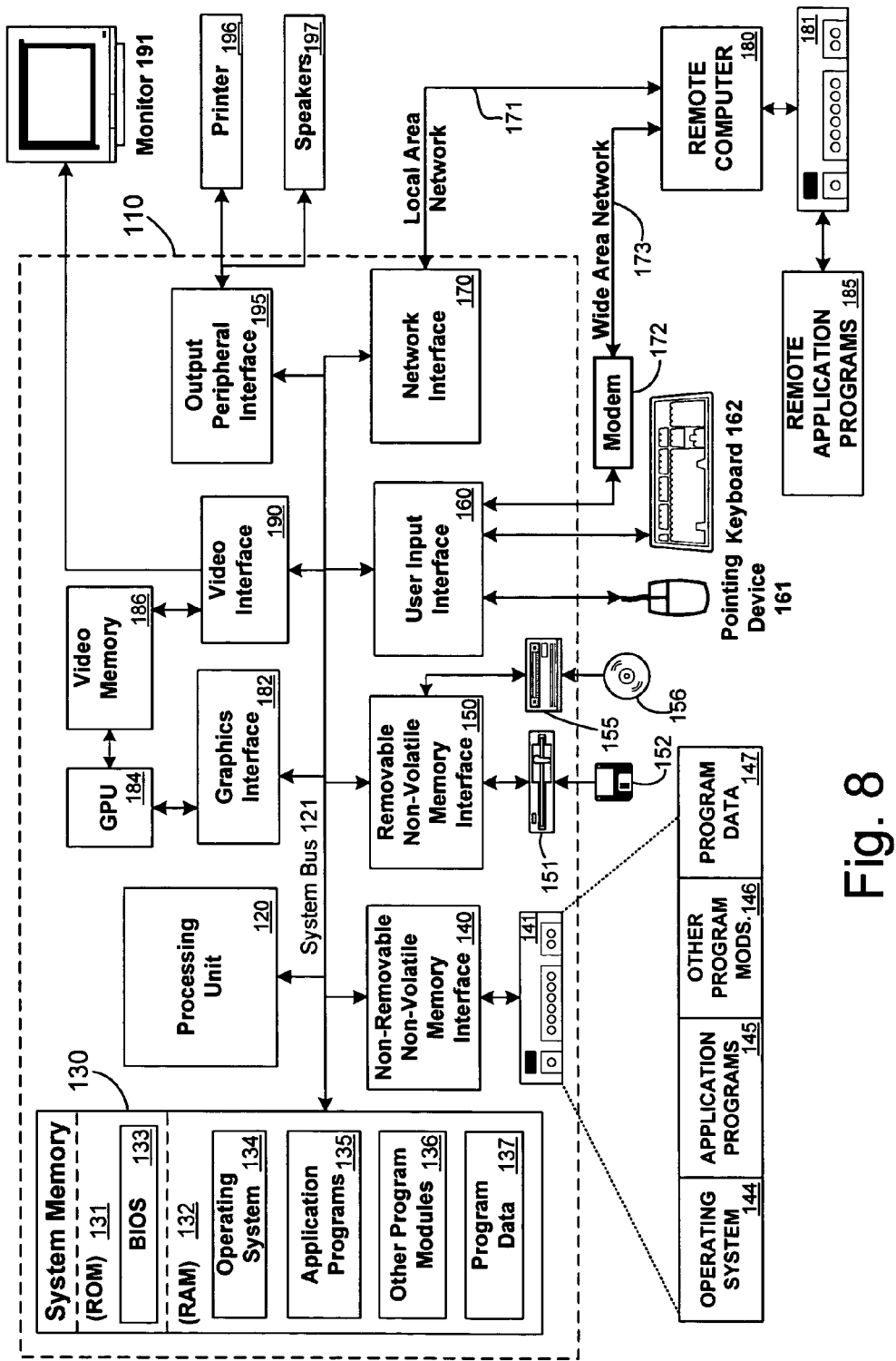
FIG. 8 is a block diagram representing an exemplary computing device in which the present invention may be implemented.

FIG. 8 and the following discussion are intended to provide a brief general description of a suitable computing device in connection with which the invention may be implemented. For example, any of the client and server computers or devices illustrated in FIG. 7 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the database testing techniques of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 8 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 8, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 8 illustrates operating system 134, application programs 135, other program modules 136, and program data 137.

The computer 110 may also include other removable/non-removable, volatile/nonvolatile computer storage media. By way of example only, FIG. 8 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 8 provide storage of computer readable instructions, data structures, program modules and other data for the computer 110. In FIG. 8, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 8. The logical connections depicted in FIG. 8 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 8 illustrates remote application programs 185 as residing on memory device 181. It will be appreciated that the network connections shown are exemplary and other means of establishing a communications link between the computers may be used.

As the foregoing illustrates, the present invention is directed to a system and method for storing and retrieving a field of an instance of a user defined type that is persisted in a database store, outside of the database store as a separate file within the file system of the computer on which the database store is implemented. The present invention is particularly advantageous for storing large data types as fields of a user defined type within a database management system. It is understood that changes may be made to the embodiments described above without departing from the broad inventive concepts thereof. For example, while an embodiment of the present invention has been described above as being implemented in Microsoft's BizTalk EAI system, it is understood that the present invention may be embodied in any EAI system that processes flat file or XML interchanges. Additionally, while certain aspects of the present invention have been described as being embodied in the context of the BizTalk EAI system described above, it is understood that those aspects of the present invention are by no means limited to implementation in that environment. Rather, the methods and systems of the present invention can be embodied in any system in which a flat file or XML interchange is processed. Accordingly, it is understood that the present invention is not limited to the particular embodiments disclosed, but is intended to cover all modifications that are within the spirit and scope of the invention as defined by the appended claims.

What is claimed:

1. A processor implemented method of processing multiple independent messages in a recoverable data interchange, comprising:
    (a) for each message in said data interchange, checking if the message may be validly processed by writing each message to a corresponding virtual stream to check if the message contains a processing error that would prevent valid processing of the virtual stream;
    (b) if a message in said data interchange may not be validly processed, placing said message in a suspend queue, determining if a catastrophic failure has occurred, and suspending processing of all messages of said data interchange if a catastrophic failure has occurred;
    (c) if said message in said data interchange may be validly processed, rewinding the corresponding virtual stream, setting the rewound virtual stream as a message stream, and determining if a routing is available for said message;
    (d) if routing is available for said message, placing said message in a message queue, otherwise placing said message in said suspend queue;
    (e) said processor getting a next message in said data interchange; and
    (f) repeating steps (a)-(e) for at least said next message.

2. A method as in claim 1, comprising the further step of receiving routing information for a message that is in said suspend queue due to unavailability of routing information and resuming processing of said message from said suspend queue using said received routing information.

3. A method as in claim 1, comprising the further step of performing recovery processing for messages in said suspend queue.

4. A method as in claim 1, wherein said multiple independent messages are in a flat file format in an input interchange data stream, comprising the further steps of saving a starting position of the current message in said input interchange data stream, processing the current message, and writing the processed current message to a virtual input stream.

5. A method as in claim 4, wherein if said current message is processed with an error, performing the steps of rewinding said virtual input stream, setting the virtual input stream as the received messages for subsequent processing, and indicating that the current message is to be placed in said suspend queue.

6. A method as in claim 4, wherein if said current message is processed without an error, performing the steps of determining a position of the next message in said input interchange data stream, replacing said input interchange data stream with a recoverable interchange stream, and indicating that the current message should be placed in the suspend queue in the event of a routing error.

7. A method as in claim 1, wherein said multiple independent messages are in an XML file format in an input interchange data stream, comprising the further steps of processing the current message and writing the processed current message to a virtual input stream.

8. A method as in claim 7, wherein if said current message is processed with an error, performing the steps of rewinding the virtual input stream, setting the virtual input stream as the received messages for subsequent processing, and indicating that the current message is to be placed in said suspend queue.

9. A method as in claim 7, wherein if said current message is processed without an error, performing the steps of rewinding the virtual input stream, setting the virtual input stream as the received messages for subsequent processing, and indicating that the current message should be placed in the suspend queue in the event of a routing failure.

10. A system for processing multiple independent messages in a recoverable data interchange, comprising:
    a message queue that accepts messages within said recoverable data interchange that are ready to be routed to a recipient;
    a suspend queue that accepts messages within said recoverable data interchange that are not ready to be routed to a recipient; and
    a processor programmed to implement a disassembler that disassembles a received data interchange into said multiple independent messages, checks if each independent message may be validly processed by writing each message to a corresponding virtual stream to check if the message contains a processing error that would prevent valid processing of the virtual stream, sets a flag associated with each message indicating whether said each message may be validly processed, and gets a next message in said data interchange irrespective of whether said each message was validly processed, and to implement a message engine that determines whether a message that may be validly processed may be routed to a recipient, rewinds the corresponding virtual stream, sets the rewound virtual stream as a message stream, places each said message in said message queue if said each message may be validly processed and routed to a recipient, and otherwise places said each message in said suspend queue, wherein if the message may not be validly processed, the processor further determines if a catastrophic failure has occurred, and suspends processing of all messages of said data interchange if a catastrophic failure has occurred.

11. A system as in claim 10, wherein said message engine checks each said message against a routing database to determine if routing information is available for said each message.

12. A system as in claim 11, wherein said message engine resumes processing of a message in said suspend queue upon receipt of routing information for said message in said suspend queue.

13. A system as in claim 10, wherein said multiple independent messages are in a flat file format in an input interchange data stream, and wherein said disassembler saves a starting position of the current message in said input interchange data stream, processes the current message, and writes the processed current message to a virtual input stream.

14. A system as in claim 13, wherein if said current message is processed with an error, said disassembler rewinds said virtual input stream, sets the virtual input stream as the received messages for subsequent processing, and indicates that the current message is to be placed in said suspend queue.

15. A system as in claim 13, wherein if said current message is processed without an error, said disassembler determines a position of the next message in said input interchange data stream, replaces said input interchange data stream with a recoverable interchange stream, and indicates that the current message should be placed in the suspend queue in the event of a routing error.

16. A system as in claim 10, wherein said multiple independent messages are in an XML file format in an input interchange data stream, and wherein said disassembler processes the current message and writes the processed current message to a virtual input stream.

17. A system as in claim 16, wherein if said current message is processed with an error, said disassembler rewinds the virtual input stream, sets the virtual input stream as the received messages for subsequent processing, and indicates that the current message is to be placed in said suspend queue.

18. A system as in claim 16, wherein if said current message is processed without an error, said disassembler rewinds the virtual input stream, sets the virtual input stream as the received messages for subsequent processing, and indicates that the current message should be placed in the suspend queue in the event of a routing failure.

19. A computer readable storage medium containing instructions that when processed by a processor causes said processor to process multiple independent messages in a recoverable data interchange, comprising:
  instructions for implementing a disassembler that performs the steps of:
  disassembling said data interchange into said multiple independent messages, and for each message in said data interchange, checking if the message may be validly processed by writing each message to a corresponding virtual stream to check if the message contains a processing error that would prevent valid processing of the virtual stream;
  if a message in said data interchange may not be validly processed, indicating that said message is to be placed in a suspend queue, determining if a catastrophic failure has occurred, suspending processing of all messages of said data interchange if a catastrophic failure has occurred, and
  processing a next message in said data interchange irrespective of the processing status of any previous messages in said data interchange; and
  instructions for implementing a message engine that performs the steps of:
  if said message in said data interchange may be validly processed, rewinding the corresponding virtual stream, setting the rewound virtual stream as a message stream and determining if a routing is available for said message; and
  if routing is available for said message, placing said message in a message queue, otherwise placing said message in said suspend queue.

20. A computer readable storage medium as in claim 19, wherein said message engine performs the further steps of: receiving routing information for a message that is in said suspend queue due to unavailability of routing information, and resuming processing of said message from said suspend queue using said received routing information.

* * * * *